(12) United States Patent
Chou

(10) Patent No.: US 9,871,890 B2
(45) Date of Patent: Jan. 16, 2018

(54) NETWORK AUTHENTICATION METHOD USING A CARD DEVICE

(71) Applicant: Hung-Chien Chou, Taichung (TW)

(72) Inventor: Hung-Chien Chou, Taichung (TW)

(*) Notice: Subject to any disclaimer, the term of this patent is extended or adjusted under 35 U.S.C. 154(b) by 158 days.

(21) Appl. No.: 14/933,207

(22) Filed: Nov. 5, 2015

(65) Prior Publication Data

US 2016/0149870 A1 May 26, 2016

(30) Foreign Application Priority Data

Nov. 26, 2014 (TW) .............................. 103141025 A

(51) Int. Cl.
*G06F 21/00* (2013.01)
*H04L 29/06* (2006.01)
*G06F 21/44* (2013.01)
*G06Q 20/34* (2012.01)
*G06Q 20/36* (2012.01)
*G06Q 20/38* (2012.01)
*G06Q 20/40* (2012.01)
*G06F 21/34* (2013.01)
*H04L 9/32* (2006.01)

(52) U.S. Cl.
CPC .............. *H04L 67/42* (2013.01); *G06F 21/34* (2013.01); *G06F 21/445* (2013.01); *G06Q 20/34* (2013.01); *G06Q 20/341* (2013.01); *G06Q 20/3674* (2013.01); *G06Q 20/3829* (2013.01); *G06Q 20/40975* (2013.01); *H04L 9/3228* (2013.01); *H04L 63/0869* (2013.01); *G06F 2221/033* (2013.01); *G06F 2221/2103* (2013.01); *G06F 2221/2107* (2013.01); *H04L 63/067* (2013.01); *H04L 2463/102* (2013.01)

(58) Field of Classification Search
CPC ....... H04L 9/32; H04L 9/3228; H04L 9/0897; H04L 63/0853; H04L 12/1464; H04L 63/067
USPC ........................................................ 713/168
See application file for complete search history.

(56) References Cited

U.S. PATENT DOCUMENTS

| 2009/0185687 A1* | 7/2009 | Wankmueller | ........ H04L 9/3273 380/277 |
| 2013/0328801 A1* | 12/2013 | Quigley | ............ G06Q 20/3674 345/173 |
| 2016/0295404 A1* | 10/2016 | Gouget | ............... H04L 63/0853 |

\* cited by examiner

*Primary Examiner* — Alexander Lagor
*Assistant Examiner* — Vu V Tran
(74) *Attorney, Agent, or Firm* — Trop Pruner & Hu, P.C.

(57) ABSTRACT

A network authentication method includes: by a user terminal, through execution of an application, connecting to a network server and sending a server verification request to a card device coupled to the user terminal; by the card device, generating a server dynamic link program based on a server verification code, encrypting the server dynamic link program, and transmitting the encrypted server dynamic linking program to the network server through the user terminal; by the user terminal, sending a server code data received from the network server to the card device as generated by the network server based on the server dynamic link program; and by the card device, verifying the network server based on the server code data and the server verification code.

12 Claims, 5 Drawing Sheets

NETWORK AUTHENTICATION METHOD USING A CARD DEVICE

CROSS-REFERENCE TO RELATED APPLICATION

This application claims priority of Taiwanese Application No. 103141025, filed on Nov. 26, 2014, the entire disclosure of which is incorporated herein by reference.

FIELD

The disclosure relates to a network authentication method, and more particularly to a network authentication method using a card device.

BACKGROUND

With the development and progress of technology, online shopping or electronic-commerce (e-commerce) has in recent years become a popular and convenient way for consumers to shop for goods.

Buyers typically use their payment cards, such as credit and debit cards, to make online shopping or e-commerce transaction payments. However, in such a payment manner, credit or debit card numbers and passwords entered by buyers may be stolen by hackers during payment. Therefore, security is a big problem for traditional payment cards.

SUMMARY

Therefore, an object of the present disclosure is to provide a network authentication method using a card device that can ensure secure authentication of a network server and an application that are associated with a network transaction.

According to the present disclosure, there is provided a network authentication method to be implemented using a user terminal associated with a user, a card device coupled to the user terminal, and a network server for authenticating at least the network server. The card device storing an application that is associated with a network transaction between a specific network server and the user terminal, and a reference server key that is associated with the specific network server. The network authentication method comprising the steps of:

A) by the user terminal, through execution of a successfully verified application, establishing a communication link with the network server over a communication network and sending a server verification request to the card device;

B) by the card device, upon receipt of the server verification request from the user terminal, generating a server dynamic link program based at least on a server verification code corresponding to the specific network server, encrypting the server dynamic link program with the reference server key, and sending the server dynamic link program encrypted thereby to the user terminal;

C) by the user terminal, through the execution of the application, transmitting the encrypted server dynamic linking program generated by the card device to the network server via the communication network;

D) by the network server, upon receipt of a server dynamic link program via the communication network, generating server code data based on a server key and on the server dynamic link program received thereby, and transmitting the server code data to the user terminal via the communication network;

E) by the user terminal, upon receipt of a server code data via the communication network, sending the server code data received thereby to the card device through the execution of the application; and F) by the card device, verifying the network server based on relationship between the server code data from the user terminal and the server verification code in step B).

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
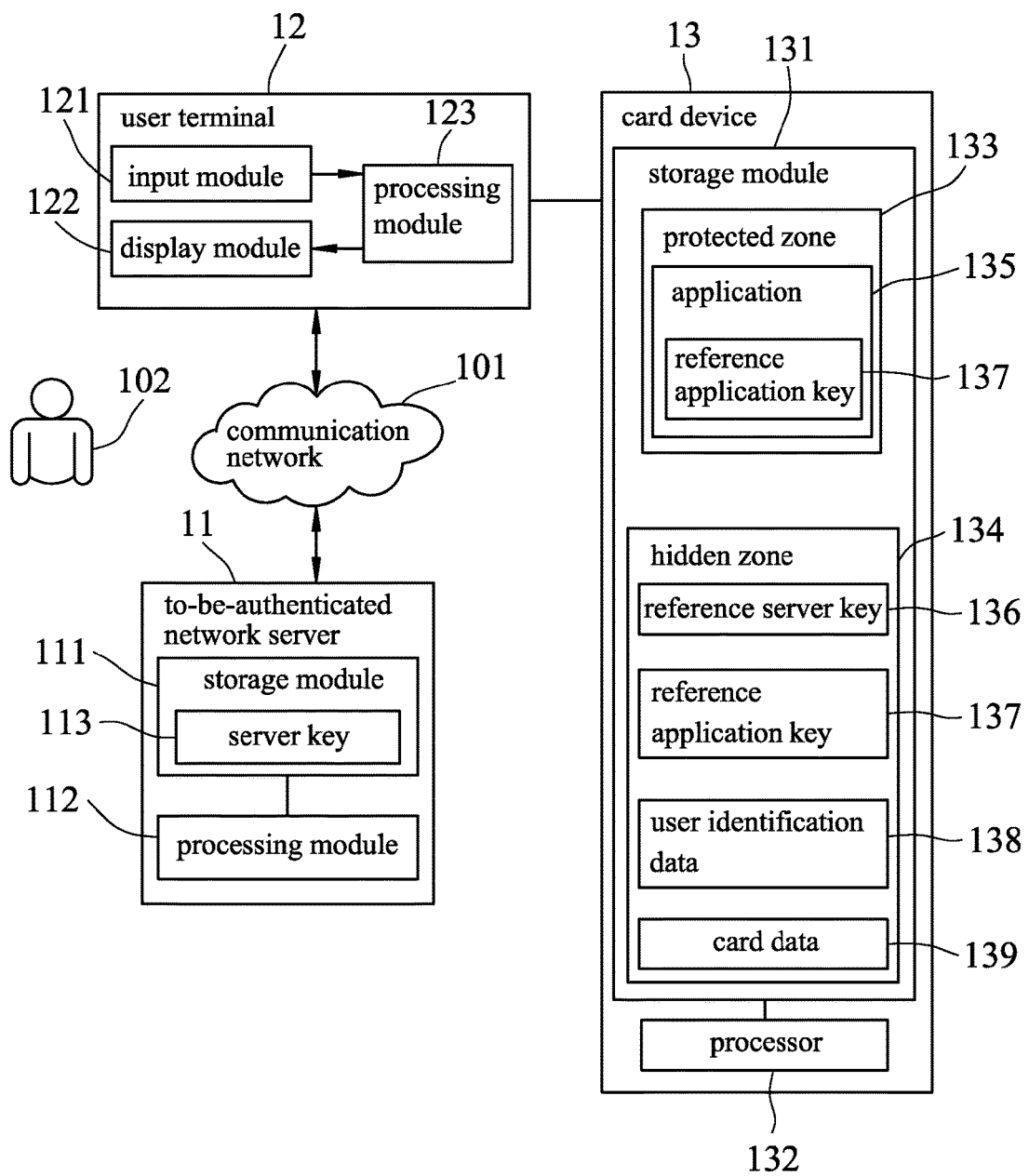
FIG. 1 is a schematic block diagram illustrating a network authentication system that is configured for implementing the embodiment of a network authentication method according to the present disclosure.

Referring to FIG. 1, a terminal device is used to implement the embodiment of a network authentication method according to the disclosure. The terminal device includes a user terminal 12, such as a mobile phone, a tablet computer or the like, and a card device 13.

The user terminal 12 is capable of connection with a communication network 101, such as the Internet, and includes an input module 121, a display module 122, and a processing module 123 coupled to the input module 121 and the display module 122.

The card device 13, such as a secure digital (SD) card, is coupled to the user terminal 12, and includes a storage module 131, and a processor 132 coupled to the storage module 131.

The storage module 131 of the card device 13 includes a protected zone 133 and a hidden zone 134. In this embodiment, the processing module 123 of the user terminal 12 is allowed read-only access to the protected zone 133, and the processor 132 is allowed read and write access to both the protected and hidden zones 133, 134. The protected zone 133 is configured to store an application 135 that is associated with the network transaction between a specific network server and the user terminal 12 and that is executable by the user terminal 12. It should be noted that the application 135 includes a reference application key 137. The hidden zone 134 is configured to store a reference server key 136 associated with the specific network server, the reference application key 137, user identification data 138 corresponding to a specific user identity, and card data 139, such as credit or debit card numbers.

It is noted that there is a partnership between a provider of the card device 13 and an owner of the specific network server.

The following details illustrate the embodiment of the network authentication method according to the disclosure implemented by the terminal device with accompanying drawings. The embodiment of the network authentication method sequentially includes an application verification procedure, a network server verification procedure and a user identity verification procedure.

Figure 2:
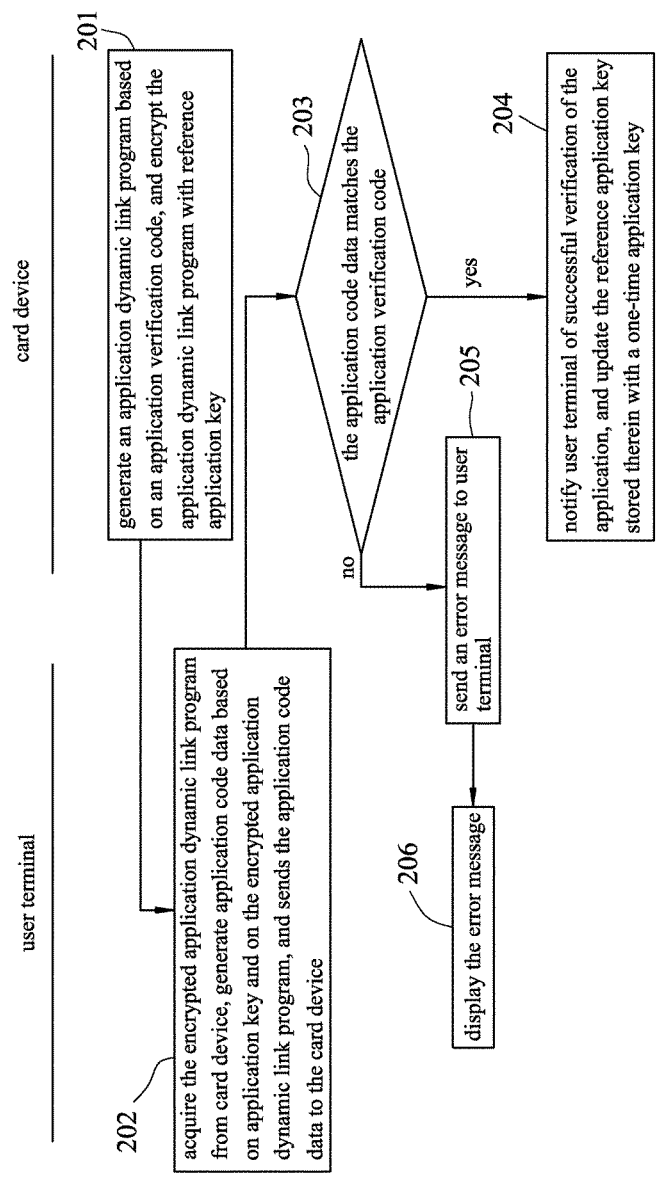
FIG. 2 is a flow chart illustrating an application verification procedure of the network authentication method of the embodiment.

Referring to FIGS. 1 and 2, the user terminal 12 and the card device 13 are used to implement the application verification procedure of the embodiment of the network authentication method according to the disclosure. The application verification procedure relates to how to verify an application to be received and executed by the user terminal 12. The application includes an application key and is associated with the network transaction. The application verification procedure includes the following steps.

In step 201, the processor 132 of the card device 13 generates an application dynamic link program based on an application verification code that corresponds to the application 135 stored in the protected zone 133 of the storage module 131 of the card device 13, and encrypts the application dynamic link program with the reference application key 137. In this embodiment, the application verification code is, but not limited to, a one-time code.

In step 202, after receipt of the application, the processing module 123 of the user terminal 12, through execution of the application received thereby, acquires from the card device 13 the application dynamic link program encrypted by the processor 132, generates application code data based on the application key included in the application that is executed thereby and on the application dynamic link program acquired thereby, and sends to the card device 13 the application code data generated thereby.

It is worth to mention that, ideally, in case that the user terminal 12 does not suffer any malicious attack from any malicious third party, the application executed by the processing module 123 of the user terminal 12 should be identical to the application 135 stored in the storage module 131 of the card device 13. However, it is likely in practice that the application received and executed by the user terminal 12 has been tampered with by malicious programs from hackers. The malicious programs may direct the user terminal 12 to a phishing site or lurk in the user terminal 12 to steal data from the card device 13, for example, the user identification data 138 and the card data 139. Therefore, it is necessary for the card device 13 to confirm whether the application executed by the processing module 123 of the user terminal 12 is identical to the application 135 stored in the storage module 131 of the card device 13 or not, that is to say, whether the application received and executed by the processing module 123 of the user terminal 12 has been tampered with or not.

Step 202 includes the following sub-steps performed by the processing module 123 of the user terminal 12: decrypting the application dynamic link program acquired from the card device 13 with the application key included in the application; and generating the application code data through execution of the application dynamic link program thus decrypted.

In the case where the application received and executed by the user terminal 12 in step 202 has not been tampered with, i.e., the application received and executed by the user terminal 12 is identical to the application 135 stored in the protected zone 133 of the storage module 131, the application key included in the application is thus the same as the reference application key 137 included in the application 135 and stored in the hidden zone 134 of the storage module 131 of the card device 13. Thus, the application dynamic link program acquired from the card device 13 is successfully decrypted by the processing module 123 of the user terminal 12 with the application key, and the application code data generated by the processing module 123 of the user terminal 12 is the same as the application verification code.

In the case where the application received and executed by the user terminal 12 in step 202 has been tampered with, the application key included in the application may differ from the reference application key 137 included in the application 135 and stored in the hidden zone 134 of the storage module 131 of the card device 13. As a result, the application dynamic link program acquired from the card device 13 may not be successfully decrypted by the processing module 123 of the user terminal 12 with the application key, and the application code data generated by the processing module 123 of the user terminal 12 may thus differ from the application verification code.

In view of the above, in step 203, the processor 132 of the card device 13 determines whether the application code data received from the user terminal 12 matches the application verification code for verifying the application executed by the processing module 123 of the user terminal 12. When the processor 132 of the card device 13 determines that the application code data matches the application verification code, the application is success fully verified by the card device 13 to be the application 135 stored in the protected zone 133 of the storage module 131. Accordingly, the flow proceeds to step 204. On the other hand, when the processor 132 of the card device 13 determines that the application code data does not match the application verification code, the card device 13 determines that the verification of the application has failed. Accordingly, the flow proceeds to step 205.

In step 204, when the application is successfully verified to be the application 135, the processor 132 of the card device 13 notifies the processing module 123 of successful verification of the application, and updates the reference application key 137 that is stored in the hidden zone 134 of the storage module 131 and that is included in the application 135 stored in the protected zone 133 of the storage module 131 with a one-time application key that is, for example, randomly provided by the processor 132.

In step 205, when the verification of the application has failed, the processor 132 of the card device 13 sends an error message indicating a failed verification of the application to the user terminal 12.

In step 206, upon receipt of the error message from the card device 13, the processing module 123 of the user terminal 12 displays the error message on the display module 122.

Figure 3A:
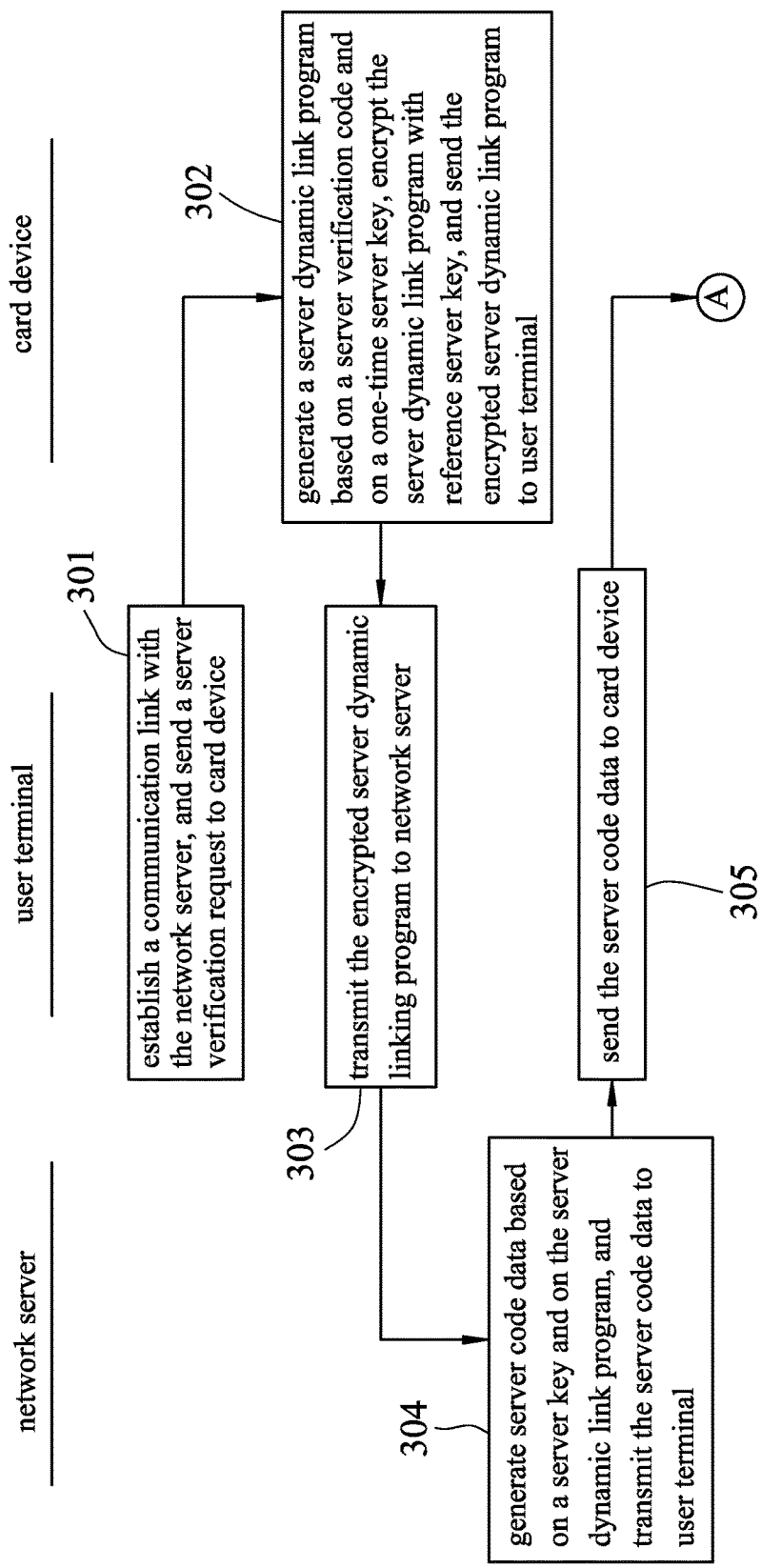
FIGS. 3A and 3B are flow charts cooperatively illustrating a network server verification procedure of the network authentication method of the embodiment.
Figure 3B:
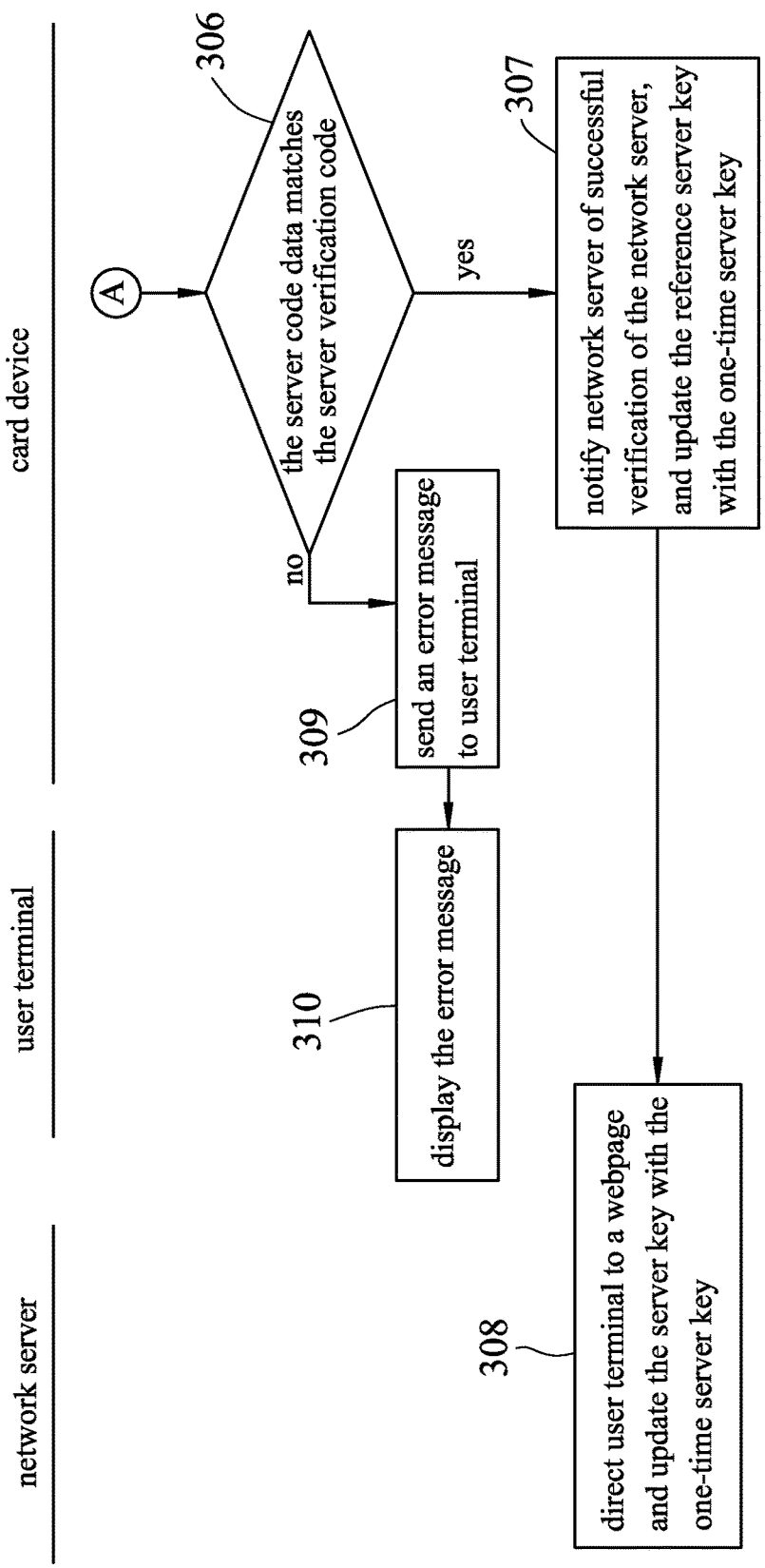

Referring to FIGS. 1, 3A and 3B, after the application has been successfully verified, the network authentication system 1 implements the network server verification procedure of the embodiment of the network authentication method according to the disclosure. The network server verification procedure relates to how to verify a to-be-authenticated network server 11. The network server 11 is capable of connection with the communication network 101. The network server 11 includes a storage module 111 having pre-stored a server key 113 therein, and a processing module 112 coupled to the storage module 111. The network server 11 is able to provide a webpage (not shown) associated with a network transaction. The network server verification procedure includes the following steps.

In step 301, upon receipt of the notification of successful verification of the application, through execution of the application, the processing module 123 of the user terminal 12 establishes a communication link with the to-be-authenticated network server 11 over a communication network 101 and sends a server verification request to the card device 13.

In step 302, upon receipt of the server verification request from the user terminal 12, the processor 132 of the card device 13 generates a server dynamic link program based on a server verification code that corresponds to the specific network server and on a one-time server key that is, for example, randomly provided by the processor 132 of the card device 13, encrypts the server dynamic link program with the reference server key 136 that is stored in the hidden zone 134 of the storage module 131, and sends the server dynamic link program encrypted thereby to the user terminal 12. In this embodiment, the server verification code is, but not limited to, a one-time code.

In step 303, through the execution of the application, the user terminal 12 transmits the encrypted server dynamic linking program from the card device 13 to the to-be-authenticated network server 11 via the communication network 101.

In step 304, upon receipt of a server dynamic link program via the communication network 101, the processing module 112 of the to-be-authenticated network server 11 generates server code data based on the server key 113 pre-stored in the storage module 111, and on the server dynamic link program received thereby, and transmits the server code data to the user terminal 12 via the communication network 101.

Step 304 includes the following sub-steps that are performed by the processing module 112 of the to-be-authenticated network server 11: decrypting the server dynamic link program received thereby with the server key 113; and generating the server code data through execution of the server dynamic link program thus decrypted.

It is worth to mention that, ideally, in case that the communication link between the user terminal 12 and the to-be-authenticated network server 11 does not suffer any malicious attack from any malicious third party, the network server 11 linked to the user terminal 12 should be the specific network server. However, it is likely in reality that the communication link between the user terminal 12 and the to-be-authenticated network server 11 has suffered a malicious attack, such as the man-in-the-middle (MITM) attack. The MITM attack may redirect the user terminal 12 to an IP address of, for example, a phishing site different from an IP address of the webpage provided by the specific network server. Therefore, it is necessary to confirm whether the to-be-authenticated network server 11 connected to the user terminal 12 is the specific network server.

In the case where the communication link between the user terminal 12 and the to-be-authenticated network server 11 does not suffer any malicious attack, that is to say, the to-be-authenticated network server 11 is indeed the specific network server, the server key 113 pre-stored in the storage module 111 of the to-be-authenticated network server 11 would be identical to the reference server key 136 stored in the hidden zone 134 of the storage module 131 of the card device 13, and the server dynamic link program received by the to-be-authenticated network server 11 would be the same as the server dynamic link program generated and encrypted by the processor 132 of the card device 13 in step 302. Therefore, in step 304, the processing module 112 of the to-be-authenticated network server 11 would successfully decrypt the server dynamic link program received thereby with the server key 113, and then generate the server code data, and the one-time server key as well, through execution of the server dynamic link program decrypted thereby. In this case, the server code data generated by the to-be-authenticated network server 11 is the same as the server verification code in step 302.

In the case where the communication link between the user terminal 12 and the to-be-authenticated network server 11 has suffered a malicious attack, for example, the to-be-authenticated network server 11 is an MITM attack node, the server key 113 used in step 304 may not be the reference server key 136 stored in the hidden zone 134 of the storage module 131. As a result, the server dynamic link program received by the processing module 112 of the to-be-authenticated network server 11 may not be decrypted with the server key 113. Therefore, the server code data generated by the to-be-authenticated network server 11 through execution of the undecrypted server dynamic link program is different from the server verification code in step 302, and the one-time server key may not be generated by the network server 11.

In step 305, upon receipt of server code data via the communication network 101, the processing module 123 of the user terminal 12 sends the server code data received thereby to the processor 132 of the card device 13 through the execution of the application.

In step 306, the processor 132 of the card device 13 determines whether or not the server code data from the user terminal 12 matches the server verification code in step 302 for verifying the to-be-authenticated network server 11. When the processor 132 of the card device 13 determines that the server code data matches the server verification code, the to-be-authenticated network server 11 is successfully verified by the card device 13 to be the specific network server. Accordingly, the flow proceeds to step 307. On the other hand, when the processor 132 of the card device 13 determines that the server code data does not match the server verification code, the card device 13 determines that the verification of the to-be-authenticated network server 11 has failed. Accordingly, the flow proceeds to step 309.

In step 307, when the to-be-authenticated network server 11 is successfully verified to be the specific network server, the processor 132 of the card device 13 notifies the to-be-authenticated network server 11 of successful verification of the to-be-authenticated network server 11 through the user terminal 12 via the communication network 101, and updates the reference server key 136 stored in the hidden zone 134 of the storage module 131 with the one-time server key used thereby in step 302.

In step 308, upon receipt of the notification of successful verification of the to-be-authenticated network server 11 from the card device 13, the processing module 112 of the to-be-authenticated network server 11, directs the user terminal 12 to the webpage so as to display the webpage on the display module 122 of the user terminal 12, and updates the server key 113 pre-stored in the storage module 111 with the one-time server key generated thereby in step 304.

In step 309, when the verification of the to-be-authenticated network server 11 has failed, the processor 132 of the card device 13 sends an error message indicating the failed verification of the to-be-authenticated network server 11 to the user terminal 12.

In step 310, upon receipt of the error message from the card device 13, the processing module 123 of the user terminal 12 displays the error message on the display module 122.

Figure 4:
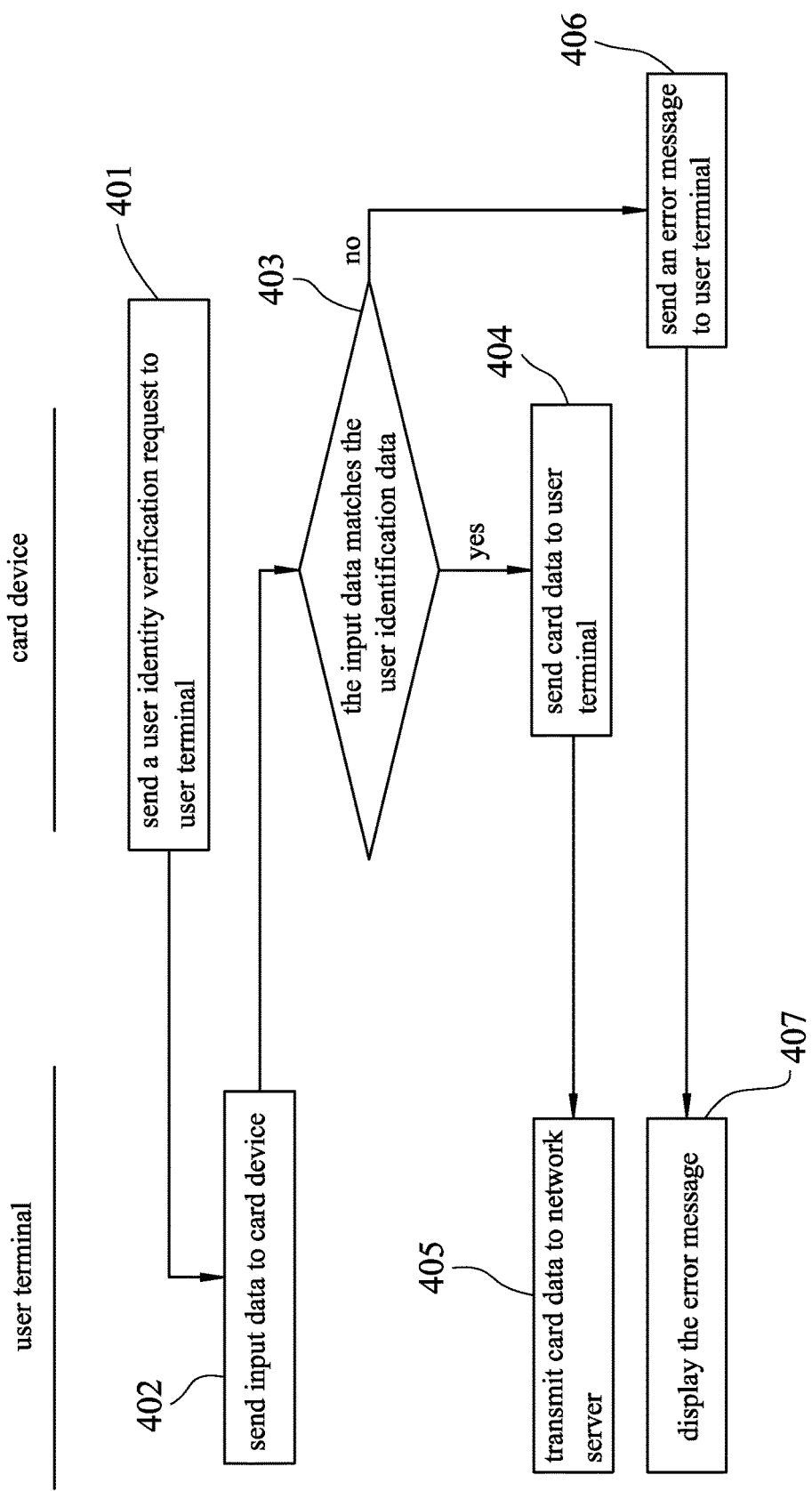
FIG. 4 is a flow chart illustrating a user identity verification procedure of the network authentication method of the embodiment.

Referring to FIGS. 1 and 4, the user terminal 12 and the card device 13 of the network authentication system 1 are used to implement the user identity verification procedure of the embodiment of the network authentication method according to the disclosure. The user identity verification procedure relates to how to verify an identity of a to-be-verified user 102 operating the user terminal 12, and includes the following steps.

In step 401, after the successful verification of the application and the to-be-authenticated network server 11, the processor 132 of the card device 13 sends a user identity verification request to the user terminal 12.

In step 402, in response to receipt of the user identity verification request from the card device 13, the processing module 123 of the user terminal 12 sends to the processor 132 of the card device 13 input data that is generated by the input module 121 of the user terminal 12 and that corresponds to an input operation performed by the to-be-verified user 102.

In step 403, the processor 132 of the card device 13 determines whether the input data from the user terminal 12 matches the user identification data 138 stored in the hidden zone 134 of the storage module 131 for verifying the identity of the to-be-verified user 102. When the processor 132 of the card device 13 determines that the input data matches the user identification data 138, the identity of the to-be-verified user 102 is successfully verified by the card device 13 to be the specific user identity. Accordingly, the flow proceeds to step 404. On the other hand, when the processor 132 of the card device 13 determines that the input data does not match the user identification data 138, the verification of the identity of the to-be-verified user 102 is determined to have failed. Accordingly, the flow proceeds to step 406.

In step 404, when the identity of the to-be-verified user 102 is successfully verified to be the specific user identity, the processor 132 of the card device 13 sends the card data 139 stored in the hidden zone 134 of the storage module 131 to the processing module 123 of the user terminal 12.

In step 405, through the execution of the application, the processing module 123 of the user terminal 12 transmits the card data 139 from the card device 13 to the processing module 112 of the network server 11 via the communication network 101. Thereafter, the network server 11 conducts a payment procedure associated with the network transaction based on the card data 139 from the user terminal 12.

In step 406, when the verification of the identity of the user 102 has failed, the processor 132 of the card device 13 sends an error message indicating the failed verification of the identity of the to-be-verified user 102 to the user terminal 12.

In step 407, upon receipt of the error message from the card device 13, the processing module 123 of the user terminal 12 displays the error message on the display module 122.

It is noted that, at each reloading of the application 135 into the user terminal 12 from the card device 13, the network authentication method of this disclosure is completely re-performed by the network authentication system 1, i.e., the application verification procedure, the network server verification procedure and the user identity verification procedure are sequentially performed.

In each application verification procedure, the processor 132 of the card device 13 generates the application dynamic link program based on the application verification code, which preferably differs from that in a previous application verification procedure, and encrypts the application dynamic link program with the reference application key 137, which has been updated in step 204 of the previous application verification procedure (step 201 of FIG. 2). Similarly, in each network server verification procedure, the processor 132 of the card device 13 generates the server dynamic link program based on the server verification code and the one-time server key, which preferably differ respectively from those in a previous server verification procedure, and encrypts the server dynamic link program with the reference server key 136, which has been updated in step 307 of the previous server verification procedure (step 302 of FIG. 3A).

Since the application/server verification code used in each application/network server verification procedure is different from that used in the previous application/network server verification procedure, and since the reference application/server key 137/136 used to encrypt the application/server dynamic link program in each application/network server verification procedure was updated in the previous application/network server verification procedure, secure authentication of the network server 11 and the application can still be ensured even if the application/server dynamic link program in the previous application/server verification procedure is stolen to obtain the application verification/server verification code and the reference application/server key 137/136 using, for example, a brute-force attack manner.

In view of the above, the network authentication method according to this disclosure can ensure secure authentication of the to-be-authenticated network server 11, the application and the identity of the to-be-verified user 102 that are associated with the network transaction.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A network authentication method to be implemented using a terminal device that includes a user terminal, and a card device coupled to the user terminal, for authenticating at least a to-be-authenticated network server, the card device storing an application that is associated with a network transaction between a specific network server and the user terminal, a reference application key that is also included in the application, and a reference server key that is associated with the specific network server, said network authentication method comprising the steps of:

i) by the card device, generating an application dynamic link program based on an application verification code that corresponds to the application stored in the card device, and encrypting the application dynamic link program with the reference application key;

ii) after receipt of an application that includes an application key and that is associated with the network transaction, by the user terminal, through execution of the application received thereby, acquiring from the card device the application dynamic link program encrypted by the card device, generating application code data based on the application key included in the application that is executed thereby and on the application dynamic link program acquired thereby, and sending to the card device the application code data generated thereby;

iii) by the card device, verifying the application executed by the user terminal based on relationship between the application code data from the user terminal and the application verification code;

A) when the application executed by the user terminal is successfully verified in step iii), by the user terminal, through execution of the application, establishing a communication link with the to-be-authenticated network server over a communication network and sending a server verification request to the card device;

B) by the card device, upon receipt of the server verification request from the user terminal, generating a server dynamic link program based at least on a server verification code corresponding to the specific network server, encrypting the server dynamic link program with the reference server key, and sending the server dynamic link program encrypted thereby to the user terminal;

C) by the user terminal, through the execution of the application, transmitting the server dynamic linking program generated and encrypted by the card device to the network server via the communication network;

D) by the user terminal, upon receipt via the communication network of a server code data from the to-be-authenticated network server as generated by the to-be-authenticated network server based on the server dynamic link program, sending the server code data received thereby to the card device through the execution of the application; and E) by the card device, verifying whether or not the to-be-authenticated network server is the specific network server based on a relationship between the server code data from the user terminal and the server verification code in step B).

2. The network authentication method as claimed in claim 1, wherein, in step B) the server verification code is a one-time code.

3. The network authentication method as claimed in claim 1, wherein, in step E), when it is determined by the card device that the server code data matches the server verification code, the to-be-authenticated network server is verified by the card device to be the specific network server.

4. The network authentication method as claimed in claim 1, further comprising, subsequent to step E), the step of:

F) when it is verified that the to-be-authenticated network server is the specific network server, by the card device, notifying the to-be-authenticated network server of successful verification of the to-be-authenticated network server through the user terminal via the communication network.

5. The network authentication method as claimed in claim 1, wherein:

in step B), the server dynamic link program is generated by the card device based on the server verification code and further on a one-time server key that is randomly provided by the card device; and said network authentication method further comprising, subsequent to step E), the step of F') when it is determined that the server code data matches the server verification code, by the card device, updating the reference server key stored therein with the one-time server key, and notifying the to-be-authenticated network server of successful verification of the network server through the user terminal via the communication network.

6. The network authentication method as claimed in claim 5, wherein the notification of successful verification of the to-be-authenticated network server enables the to-be-authenticated network server to update a server key pre-stored therein with the one-time server key.

7. The network authentication method as claimed in claim 1, the card device further storing user identification data that corresponds to a specific user identity, said network authentication method further comprising, subsequent to step E), the steps of:

H) when it is determined that the server code data matches the server verification code, by the card device, sending a user identity verification request to the user terminal;

I) by the user terminal, in response to receipt of the user identity verification request from the card device, sending to the card device input data that is generated by the user terminal and that corresponds to an input operation performed by a to-be-verified user; and J) by the card device, verifying the identity of the to-be-verified user based on relationship between the input data from the user terminal and the user identification data stored therein.

8. The network authentication method as claimed in claim 7, wherein, in step J), when it is determined by the card device that the input data matches the user identification data, the identity of the to-be-verified user is verified to be the specific user identity.

9. The network authentication method as claimed in claim 1, wherein, in step i), the application verification code is a one-time code.

10. The network authentication method as claimed in claim 1, wherein, in step iii), when it is determined that the application code data matches the application verification code, the application executed by the user terminal is successfully verified to be the application stored in the card device.

11. The network authentication method as claimed in claim 1, further comprising, between steps iii) and A), the step of iv) when it is determined that the application code data matches the application verification code, by the card device, updating the reference application key that is stored therein and that is included in the application stored therein with a one-time application key.

12. The network authentication method as claimed in claim 1, wherein step ii) includes the sub-steps of:

decrypting, by the user terminal, the application dynamic link program acquired from the card device with the application key, and executing, by the user terminal, the application thus decrypted to generate the application code data.

* * * * *